United States Patent
Zhou et al.

(10) Patent No.: US 12,540,841 B2
(45) Date of Patent: Feb. 3, 2026

(54) PARTICULATE MATTER BATCHING APPARATUS

(71) Applicants: Yuanhao Zhou, Pittsburgh, PA (US); Zhengyang Liu, Pittsburgh, PA (US); Hong Chen, Pittsburgh, PA (US)

(72) Inventors: Yuanhao Zhou, Pittsburgh, PA (US); Zhengyang Liu, Pittsburgh, PA (US); Hong Chen, Pittsburgh, PA (US)

( * ) Notice: Subject to any disclaimer, the term of this patent is extended or adjusted under 35 U.S.C. 154(b) by 180 days.

(21) Appl. No.: 18/401,032

(22) Filed: Dec. 29, 2023

(65) Prior Publication Data

US 2025/0216238 A1 Jul. 3, 2025

(51) Int. Cl.
| | | |
|---|---|---|
| G01F 11/24 | (2006.01) | |
| G01F 11/00 | (2006.01) | |
| G01F 13/00 | (2006.01) | |
| G01F 15/00 | (2006.01) | |

(52) U.S. Cl.
CPC ............ *G01F 11/24* (2013.01); *G01F 11/003* (2013.01); *G01F 13/001* (2013.01); *G01F 15/005* (2013.01)

(58) Field of Classification Search
CPC .......... G01F 11/20; G01F 11/42; G01F 11/48; G01F 11/10; G01F 11/24; G01F 11/003; G01F 13/001; G01F 15/005
See application file for complete search history.

(56) References Cited

U.S. PATENT DOCUMENTS

| | | | | |
|---|---|---|---|---|
| 4,974,646 | A * | 12/1990 | Martin | B65D 90/54 406/84 |
| 5,474,211 | A * | 12/1995 | Hellenberg | B01F 35/8822 222/144.5 |
| 6,412,658 | B1 * | 7/2002 | Bartholomew | B01F 33/841 222/144.5 |
| 6,672,341 | B2 * | 1/2004 | Bartholomew | G07F 11/70 222/144 |
| 7,311,223 | B2 * | 12/2007 | Post | B01F 35/71775 222/413 |
| 7,527,078 | B2 * | 5/2009 | Driessen | B01F 35/881 141/83 |
| 7,614,429 | B2 * | 11/2009 | Pluvinage | B01L 3/021 222/161 |

(Continued)

*Primary Examiner* — Nicolas A Arnett
(74) *Attorney, Agent, or Firm* — Westbridge IP LLC

(57) ABSTRACT

Disclosed is a particulate matter batching apparatus. A plurality of particulate matter batching devices are arranged at intervals around the rotating axis, thereby enabling each particulate matter batching device to enter the discharging position. Particulate matter in the batching container can be controlled to start or stop passing through the discharging port through the discharging adjusting mechanism, thereby enabling the particulate matter in the batching container to fall to the material receiving device. Different particulate matter batching devices are driven to move to the discharging position in sequence for discharging particulate matter, so that the particulate matter can be mixed. When each particulate matter batching device leaves the discharging position, the next particulate matter batching device can enter the discharging position more quickly, so that the time for switching the different particulate matter batching devices to the discharging position can be shortened, and the batching efficiency is improved.

18 Claims, 12 Drawing Sheets

(56) References Cited

U.S. PATENT DOCUMENTS

| | | | | |
|---|---|---|---|---|
| 8,104,521 | B2* | 1/2012 | Luchinger | G01F 13/001 |
| | | | | 222/161 |
| 8,176,950 | B2* | 5/2012 | Luchinger | G01F 13/001 |
| | | | | 141/83 |
| 8,230,887 | B2* | 7/2012 | Poole | B65B 1/32 |
| | | | | 141/2 |
| 8,348,099 | B2* | 1/2013 | Chen | G07F 17/0092 |
| | | | | 222/196 |
| 8,448,823 | B2* | 5/2013 | Engels | B01F 33/84 |
| | | | | 222/23 |
| 8,684,048 | B2* | 4/2014 | Koga | B65B 39/12 |
| | | | | 141/147 |
| 9,591,943 | B2* | 3/2017 | Murray | A47J 31/407 |
| 10,501,213 | B2* | 12/2019 | Verhoest | B01F 21/00 |
| 11,235,299 | B2* | 2/2022 | Orsita | B01F 33/841 |
| 2023/0091547 | A1* | 3/2023 | Comin | B67C 3/208 |
| | | | | 141/1 |
| 2025/0216239 | A1* | 7/2025 | Zhou | G01F 13/001 |

* cited by examiner

PARTICULATE MATTER BATCHING APPARATUS

TECHNICAL FIELD

The present disclosure relates to the technical field of particulate matter batching, and in particular, to a particulate matter batching apparatus.

BACKGROUND

Ingredient weighing tasks of powder and particles are very common in laboratory and industrial research and development stages. However, in most laboratories and research and development scenarios, these weighing tasks are completed manually, and precious time and energy of researchers and developers are consumed. In the related art, the mechanical arm is used for grabbing the particulate matter batching device to prepare the material receiving bottle, but when different particulate matter materials are taken each time, the grabbed particulate matter batching device needs to be put back to the original position firstly, so that the batching efficiency is low.

SUMMARY

The invention provides a particulate matter batching apparatus for solving the technical problem of how to improve the batching efficiency of particulate matter batching apparatus.

In order to achieve the above purpose, the particulate matter batching apparatus provided in the present invention includes a bracket, a first driving mechanism, a plurality of particulate matter batching devices, and a receiving device. Wherein the first driving mechanism is mounted on the bracket, and the first driving mechanism has a rotation axis extending in a height direction. Each particulate matter batching device includes a batching container and a discharging adjusting mechanism. A discharging port is formed in the bottom portion of the batching container. The discharging adjusting mechanism is configured to control particulate matter in the batching container to start or stop passing through the discharging port. The particulate matter batching apparatus is installed on the first driving mechanism so as to rotate around the rotating axis under the driving of the first driving mechanism. The particulate matter batching apparatus has a discharging position on the rotating track. The plurality of particulate matter batching devices are arranged at intervals around the rotating axis so as to switch into or exit from the discharging position under the driving of the first driving mechanism. Wherein the receiving device is mounted below the discharging position and is configured to receive particulate matter from the particulate matter batching device.

Optionally, the particulate matter batching apparatus further includes a second driving mechanism, the second driving mechanism includes a first driving device and a driving member connected to the first driving device, and the driving member is configured to couple with and drive the discharging adjusting mechanism of one of the plurality of particulate matter batching devices when the one of the plurality of particulate matter batching devices moves to the discharging position.

Optionally, the first driving mechanism includes a center portion and a rotating cylinder, the rotating cylinder is annularly disposed at the center portion, and each of the plurality of particulate matter batching devices is connected to the rotating cylinder. The second driving mechanism further includes an eccentric rotating mechanism. The eccentric rotating mechanism is installed on the center portion, the first driving device is installed on the eccentric rotating mechanism, so that a center line of the driving piece is parallel to the rotating axis. The eccentric rotating mechanism is configured to drive the first driving device to rotate around the rotating axis so as to be coupled with different discharging adjusting mechanisms of different particle batching devices.

Optionally, the second driving mechanism further includes a first lifting mechanism, the first lifting mechanism is mounted on the center portion, and the eccentric rotating mechanism is mounted on the first lifting mechanism to be driven to lift by the first lifting mechanism.

Optionally, the first driving mechanism includes a center portion and a rotating cylinder. The rotating cylinder is annularly disposed at the center portion, and each of the particulate matter batching devices is connected to the rotating cylinder. The second driving mechanism further includes a planar motion mechanism. The planar motion mechanism is mounted on the central portion. The first driving device is mounted to the planar motion mechanism, and the planar motion mechanism is configured to drive the driving member to be coupled with different discharging adjusting mechanisms of different particulate matter batching devices.

Optionally, the discharging adjusting mechanism includes a plurality of valve plates and an adjusting sleeve. The plurality of valve plates are rotatably mounted in the batching container to adjust an opening degree of the discharging port, and the adjusting sleeve is rotatably sleeved on the batching container and is in transmission connection with the valve plate to drive the valve plate to rotate. Transmission teeth are arranged on a peripheral wall of the adjusting sleeve, and the driving piece is a driving gear. The plurality of valve plates are distributed in a circumferential direction of the discharging port, each valve plate includes an adjusting end, and the adjusting end rotates along with the valve plate to get close to or away from a center of the discharging port. The adjusting ends of the plurality of valve plates are configured to gather towards the center of the discharging port to jointly close the discharging port, and to disperse in a direction far away from the center of the discharging port to jointly open the discharging port. A shaft hole and an adjusting hole are defined in a peripheral wall of the batching container. A rotating shaft and a transmission piece are connected to an end of the valve plate far away from the adjusting end. The rotating shaft is rotatably mounted in the shaft hole, and the transmission piece extends out of the batching container through the adjusting hole. The adjusting sleeve threadedly engages with the ingredient container and is connected to the driving member to drive the driving member to move.

Optionally, the receiving device includes a third driving mechanism and a rotating platform. The rotating platform is provided with a placing portion, and the placing portion is configured to receive the receiving container. The third driving mechanism includes a second rotating mechanism, and the rotating platform is mounted to the second rotating mechanism to be driven to rotate by the second rotating mechanism. The placing portion has a receiving position on the rotating track, and the receiving position is located below the discharging position.

Optionally, the receiving device further includes a weighing device, the weighing device is located below the receiving position, and the weighing device is configured to weigh the weight of the receiving container.

Optionally, the third driving mechanism further includes a second lifting mechanism, and the second lifting mechanism is connected to the rotating platform to drive the rotating platform to ascend and descend. The placing portion defines a receiving hole, and the receiving hole is configured to receive the receiving container to enable the receiving container to hang in the receiving hole. The second lifting mechanism is configured to drive the rotating platform to descend when the placing portion rotates to the material receiving position so as to place the receiving container on the weighing device.

Optionally, the particulate matter batching apparatus further includes a vibrator and a linear driving device, wherein the linear driving device is mounted to the central portion. The vibrator is mounted to the linear driving device, and the linear driving device is configured to drive the vibrator to abut against or move far away from the particulate matter batching apparatus located at the discharging position.

Optionally, the particulate matter batching apparatus further includes a control module, a display module and an interaction module, wherein the interaction module is electrically connected to the control module and the display module, and the control module is electrically connected to the first driving mechanism.

In the technical solution of the particulate matter batching device of the present invention, the plurality of particulate matter batching devices are mounted to the first driving mechanism and are arranged at intervals around the rotation axis, to enable the first driving mechanism to drive the plurality of particulate matter batching devices to rotate around the rotation axis, thereby enabling each particulate matter batching device to switch into the discharging position in a switchable manner. After the particulate matter batching device enters the discharging position, particulate matter in the batching container can be controlled to start or stop passing through the discharging port through the discharging adjusting mechanism, thereby enabling particulate matter in the batching container to fall to the receiving device. Different particulate matter batching devices are driven to the discharging position in sequence for discharging, thereby mixing the particulate matter. Since the first driving mechanism drives the switching positions of the particulate matter batching devices in a rotating mode, the activity range of the plurality of particulate matter batching devices can be reduced, and the occupied space in the operation process of the particulate matter batching equipment is reduced. In addition, when each particulate matter batching device leaves the discharging position, the next particulate matter batching device can enter the discharging position more quickly, so that the time for switching different particulate matter batching devices to the discharging position can be shortened, and the batching efficiency is improved.

BRIEF DESCRIPTION OF THE DRAWINGS

In order to more clearly illustrate the technical solutions of the embodiments of the present disclosure or the prior art, the accompanying drawings which need to be used in embodiments or prior art descriptions are briefly described below. In an obvious way, the accompanying drawings in the following description are merely some embodiments of the present invention. For ordinary technicians in this field who can obtain other drawings according to these drawings without creative labor.

DETAILED DESCRIPTION OF THE EMBODIMENTS

Figure 1:
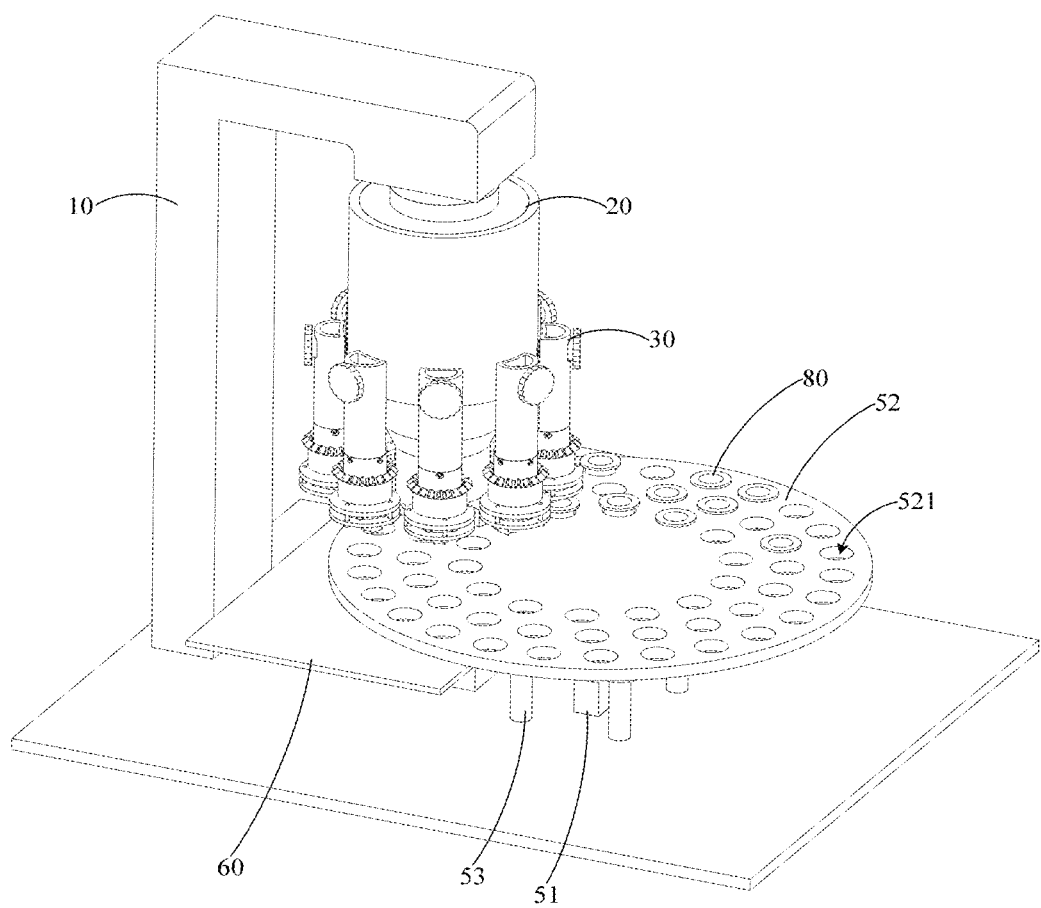
FIG. 1 is a schematic view of a first embodiment of a particulate matter batching apparatus of the present disclosure.

The technical solutions in the embodiments of the presented disclosure will be do a clearly and completely description with the accompanying drawings in the embodiments of the presented disclosure. Obviously, the described embodiments are only a part of the embodiments of the present invention, but are not all embodiments. Based on the embodiments of the presented invention, all other embodiments are developed and obtained by an ordinary person skilled in the art without any creative efforts, other embodiments obtained thereby are still covered by the present invention.

It should be noted that, if the embodiments of the present disclosure relate to directional indication (such as up, down, left, right, front, and back), the directional indication is only used to interpret the relative positional relationship, the motion situation, etc. between the components under a certain specific attitude (as shown in the drawings), and if the specific attitude changes, the directional indication also changes accordingly.

In addition, if the embodiments of the present disclosure relate to descriptions such as "first" and "second", the descriptions of "first", "second" and the like are only used for descriptive purposes. It is not to be understood as indicating or implying their relative importance or implicitly indicating the number of technical features indicated. Thus, the features defined with "first" and "second" may explicitly or implicitly include at least one of the features. In addition, the technical solutions between the various embodiments may be combined with each other. However, a person of ordinary skill in the art must be implemented as a basis. When the combination of the technical solutions is contradictory or cannot be implemented, it should be considered that the combination of the technical solutions does not exist, and is not within the scope of protection of the present disclosure.

In this embodiment of the present disclosure, as shown in FIG. 1 to FIG. 4, the particulate matter batching apparatus includes a bracket 10, a first driving mechanism 20, a plurality of particulate matter batching devices 30, and a receiving device. The first driving mechanism 20 is mounted to the bracket 10. The first driving mechanism 20 has a rotation axis extending in a height direction. The particulate matter batching device 30 includes a batching container 31 and a discharging adjusting mechanism 32. A discharging port 311 is formed in the bottom of the batching container 31. The discharging adjusting mechanism 32 is configured to control particulate matter in the batching container 31 to start or stop passing through the discharging port 311. The particulate matter batching device 30 is mounted on the first driving mechanism 20 to rotate around the rotation axis under the driving of the first driving mechanism 20. A discharging position is defined on a rotating track of the plurality of the particulate matter batching devices. The plurality of particulate matter batching devices 30 are arranged at intervals around the rotation axis, so as to switchably enter or exit the discharging position under the driving of the first driving mechanism 20. The receiving device is mounted below the discharging position and is configured to receive particulate matter from the particulate matter batching devices 30.

In this embodiment, the particulate matter batching device may further include a base, and the bracket 10 is mounted to the base. The first driving mechanism 20 is mounted to the top end of the bracket 10. The first driving mechanism 20 is suspended from the bracket and keeps a distance relative to the base. The first driving mechanism 20 can drive the particulate matter batching devices 30 to rotate around the rotation axis. The number of the particulate matter batching devices 30 may be two, or three or more, which is not limited herein, and only the plurality of particulate matter batching devices 30 need to be arranged at intervals around the rotation axis, so that the particulate matter batching devices can alternately enter the discharging position.

The particulate matter batching device 30 is configured to store powder material or particulate matter, and to control the particulate matter to fall into the receiving device. The batching container 31 is configured to store powder material or particulate matter. The batching container 31 may be in the shape of a bottle, in particular, a cylindrical bottle shape, or a cuboid bottle shape, or may be a special-shaped bottle shape, which is not limited herein. The discharging port 311 is located in the bottom portion of the batching container 31 for allowing particulate matter to fall out of the batching container 31.

The discharging adjusting mechanism 32 controls the particulate matter to start or stop passing through the discharging port, and may shake or stop shaking the particulate matter. For example, the particulate matter can be blocked in the discharging port 311 in a normal state. The discharging adjusting mechanism 32 can shake the particulate matter to move out of the discharging port 311 in a shake-off manner. When discharging is not needed, the particulate matter may stop shaking to stop discharging.

In another embodiment, the discharging adjusting mechanism 32 may start or stop the particulate matter through the discharging port 311 by controlling the opening degree of the discharging port 311. When the discharging adjusting mechanism 32 opens the discharging port 311, the particulate matter may fall out of the discharging port 311 under the action of gravity. When the discharging adjusting mechanism 32 closes the discharging port 311, the particulate matter stops falling out of the discharging port 311. The discharging adjusting mechanism 32 can only control the opening or closing of the discharging port 311, and can also control the opening degree of the discharging port 311 in the process of controlling the discharging port 311 to be opened, and specifically, the discharging port 311 can be gradually adjusted from a fully closed state to a fully open state.

There may be one or more discharging positions For example, there is one discharging position, and the number of the particulate matter batching devices 30 is four. The four particulate matter batching devices 30 may alternately enter the discharging position along with the rotation of the first driving mechanism 20. When the particulate matter batching device 30 reaches the discharging position, the discharging adjusting mechanism 32 can open the discharging port 311 of the batching container 31, so that the particulate matter in the batching container 31 fall onto the receiving device located below the discharging position through the discharging port 311, thereby achieving mixing different particulate matter.

Since the first driving mechanism 20 drives each of the particulate matter batching devices 30 to switch positions in a rotating manner, the activity range of the plurality of particulate matter batching devices 30 can be reduced, thereby reducing the occupied space in the operation process of the particulate matter batching apparatus. In addition, when each particulate matter batching device 30 leaves the discharging position, the next particulate matter batching device 30 can enter the discharging position more quickly, so that the time for switching the different particle batching devices 30 to the discharging position can be shortened, and the batching efficiency is improved.

Specifically, as shown in FIG. 7 to FIG. 10, the discharging adjusting mechanism 32 includes a valve plate 33 and an adjusting sleeve 34. The valve plate 33 is rotatably mounted in the batching container 31 to adjust the opening degree of the discharging port 311. The adjusting sleeve 34 is rotatably sleeved on the batching container 31 and is in transmission connection with the valve plate 33 to drive the valve plate 33 to rotate.

The adjusting sleeve 34 is located out of the batching container 31. The valve plate 33 is located in the batching container 31. The rotation of the adjusting sleeve 34 can drive the valve plate 33 to rotate, thereby enabling the valve plate 33 to adjust the opening degree of the discharging port 311.

As shown in FIG. 7 to FIG. 10, there are a plurality of valve plates 33. The plurality of valve plates 33 are distributed along the circumferential direction of the discharging port 311, and the valve plate 33 has an adjusting end 331. The adjusting end 331 rotates along with the valve plate 33 to be close to or away from the center of the discharging port 311. The adjusting ends 331 of the plurality of valve plates 33 are configured to converge toward the center of the discharging port 311 to jointly close the discharging port 311, and are configured to disperse in a direction far away from the center of the discharging port 311 to jointly open the discharging port 311. A peripheral wall of the batching container 31 defines a shaft hole and an adjusting hole 312. One end of the valve plate 33, far away from the adjusting end 331, is connected to a rotating shaft 332 and a driving member 333. The rotating shaft 332 is received in the shaft hole and is rotatable in the shaft hole. The driving member 333 passes through the adjusting hole 312 to extend out of the batching container 31. The adjusting sleeve 34 is in threaded fit with the batching container 31 and is connected to the driving member 333 to drive the driving member 333 to move.

The width of the valve plate 33 gradually narrows from one end away from the adjusting end 331 toward the adjusting end 331. When the adjusting end 331 rotates along with the valve plate 33 to the center of the discharging port 311, the part of the discharging port 311 is covered. When the adjusting end 331 leaves the center of the discharging port 311, a part of the discharging port 311 is opened. When the adjusting ends 331 of the plurality of valve plates 33 are gathered towards the center of the discharging port 311, the discharging port 311 can be closed together. When the adjusting ends 331 of the plurality of valve plates 33 are dispersed in a direction far away from the center of the discharging port 311, the discharging port 311 can be gradually opened. In this way, the covering area of the adjusting end 331 of each valve plate 33 on the discharging port 311 can be controlled by controlling the rotation distance of the plurality of valve plates 33, thereby adjusting the opening degree of the discharging port 311.

When the amount of the required particulate matter is large, the user may increase the opening degree of the discharging port 311 by controlling the discharging adjusting mechanism 32, so as to accelerate the discharging speed of the particulate matter, thereby improving the batching efficiency. When the particulate matter is close to the preset weight, the user can reduce the opening degree of the discharging port 311 by controlling the discharging adjusting mechanism 32, so as to release the discharging speed of the particulate matter, thereby reducing the weight increasing speed of the particulate matter. The discharging port 311 can be turned off more quickly when the particulate matter reaches the preset weight, so that the particulate matter discharging can be stopped more quickly, so as to reduce the weighing error of the particulate matter and to improve the ingredient accuracy. Moreover, the opening degree of the discharging port 311 can be adjusted, and the discharging port 311 can also adapt to particulate matter of different volumes, so that particulate matter with large size can smoothly pass through the discharging port 311, and the discharging port 311 is prevented from being blocked. In addition, the opening degree of the discharging port 311 is jointly controlled through the plurality of valve plates 33, which improves the control precision of the opening degree of the discharging port 311, and controls the batching amount of the particles more accurately, thereby improving the batching precision.

The valve plate 33 may be in a straight sheet shape or an arc sheet shape.

Figure 11:
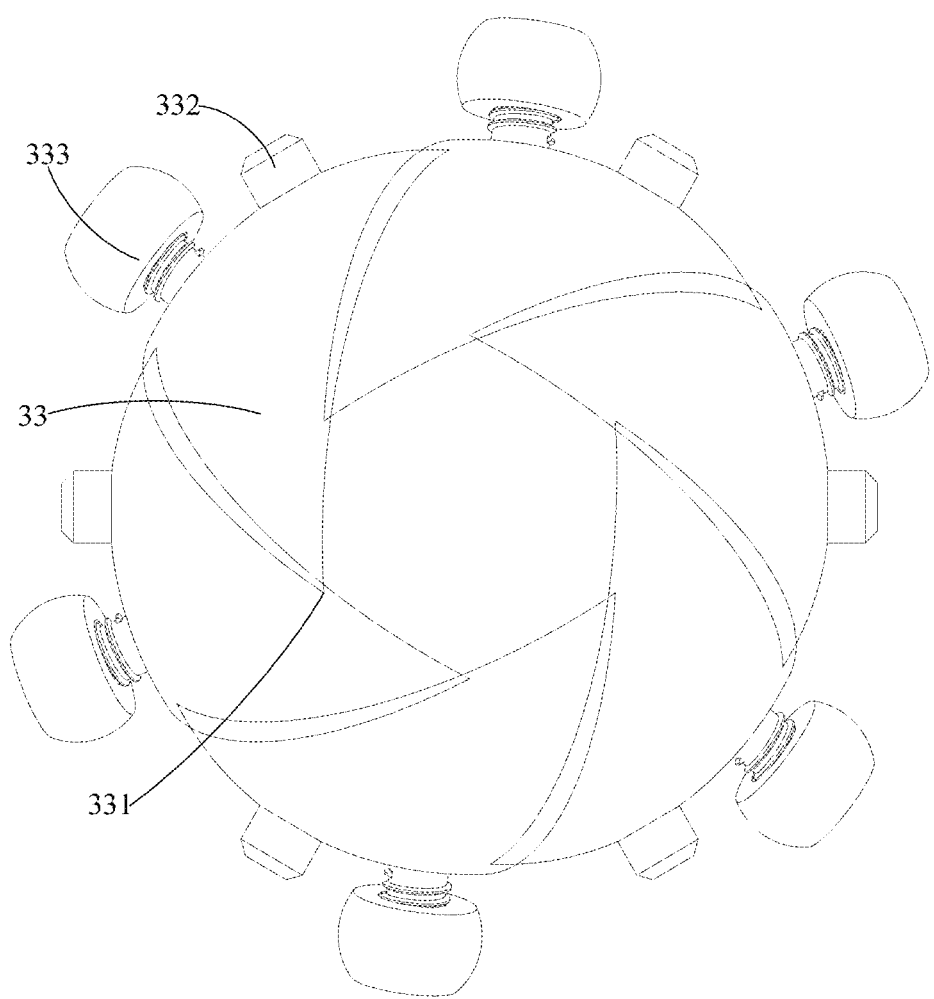
FIG. 11 is a schematic view of an embodiment of the particulate matter batching apparatus of the present disclosure.
Figure 12:
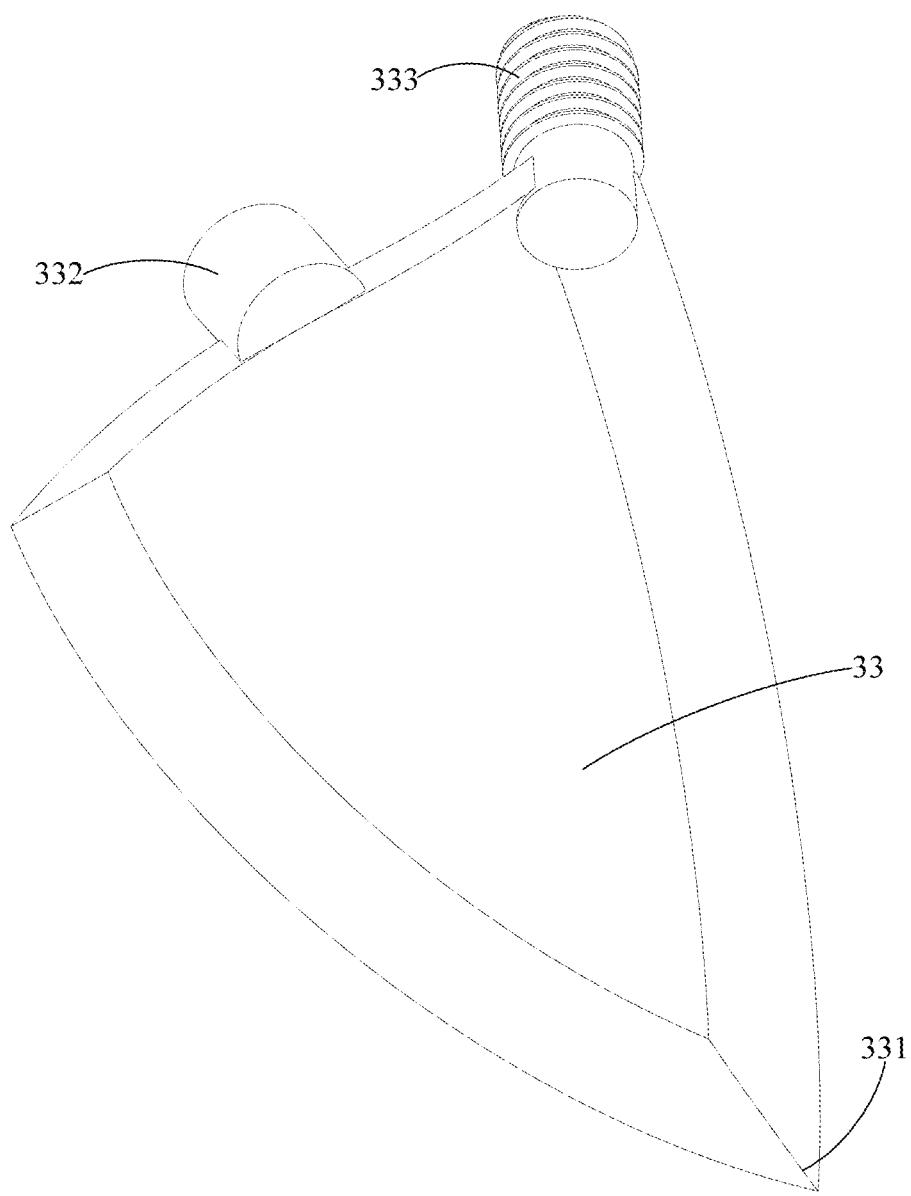
FIG. 12 is a schematic view of the valve plate of an embodiment of the present disclosure.

Specifically, as shown in FIG. 11 and FIG. 12, the inner wall surface of the bottom portion of the batching container 31 is in a spherical surface shape. The valve plate 33 is in an arc shape matched with the spherical surface shape, so as to be close to the inner wall surface of the bottom portion of the batching container 31 and to rotate along the inner wall surface of the bottom portion of the batching container 31.

The inner wall surface of the bottom portion of the batching container 31 is set to be in a spherical surface shape. The discharging port 311 is formed at the bottom portion of the spherical surface, so that the particulate matter in the batching container 31 can always flow towards the discharging port 311 under the action of gravity, so as to ensure the discharging speed of each time. The shape of the valve plate 33 matches with the inner wall surface of the bottom portion of the batching container 31. The outer diameter of the valve plate 33 is consistent with or slightly smaller than the inner diameter of the bottom portion of the batching container 31. That is, the valve plate 33 is equivalent to a part cut from the spherical surface, so that the valve plate 33 can be attached to the inner wall surface of the bottom of the batching container 31 to rotate. Therefore, the occupied space of the valve plate 33 in the batching container 31 can be reduced, and the resistance of the particulate matter to the movement of the valve plate 33 can be reduced. The process of adjusting the opening degree of the discharging port 311 by the valve plate 33 is smoother. Since the valve plate 33 is in the shape of an arc sheet adapted to the bottom of the batching container 31, the plurality of valve plates 33 are jointly spliced into a spherical surface when the adjusting ends 331 of the plurality of valve plates 33 are gathered at the center of the discharging port 311, thereby enabling the discharging port 311 to be completely closed to prevent particulate matter from leaking.

The valve plate 33 can rotate around the rotating shaft 332. The adjusting sleeve 34 can drive the driving member 333 to move to enable the valve plate 33 to rotate when the adjustment sleeve 34 is driven from the outer side of the batching container 31. It can be understood that the movement track of the driving member 333 is arc-shaped, so that the shape and size of the adjusting hole 312 should adapt to the movement range of the driving member 333, so that the driving member 333 can effectively rotate around the rotation shaft 332, thereby driving the entire valve plate 33 to rotate.

There are a plurality of axle holes. The plurality of shaft holes are arranged at intervals along the circumferential direction of the batching container 31. The rotating shaft 332 of each valve plate 33 is rotatably fitted with each of the shaft holes. There are a plurality of adjusting holes 312. The plurality of adjusting holes 312 are arranged at intervals along the circumferential direction of the batching container 31. The driving member 333 of each valve plate 33 extends out of the batching container 31 through the corresponding adjusting hole 312.

The inner peripheral wall of the adjusting sleeve 34 has internal threads. The outer peripheral wall of the batching container 31 has external threads engaging with the internal thread to achieve the threaded fit between the adjusting sleeve 34 and the batching container 31. The position change of the sleeve 34 in the height direction of the batching container 31 can be adjusted by driving the adjusting sleeve 34 to rotate. Compared with the control process of linear motion, the control process of the rotation is lower. The adjusting sleeve 34 can be conveniently controlled to change the position of the adjusting sleeve 34 in the height direction of the batching container 31 each time by controlling the rotation angle or the rotation distance of the adjusting sleeve 34 each time, thereby controlling the change amount of the opening degree of the discharging port 311 each time, so that the opening degree adjusting process of the discharging port 311 is more accurate, and the batching precision of the particles is improved.

The discharging adjusting mechanism 32 further includes an adjusting ring. The adjusting ring is sleeved on the batching container 31 and connected to the adjusting sleeve 34 at intervals, so as to move along with the adjusting sleeve 34. The driving member 333 is located between the adjusting sleeve 34 and the adjustment ring, and abuts against the adjusting sleeve 34 and the adjustment ring. The adjusting sleeve 34 and the adjusting ring are clamped to the driving member 333. When the adjusting sleeve 34 moves towards the driving member 333, the driving member 333 drives the valve plate 33 to rotate under the pressure of the adjusting sleeve 34, so that the valve plate 33 gradually opens/closes the discharging port. When the adjusting sleeve 34 moves far away from the driving member 333, the adjusting ring presses the driving member 333. The driving member 333 drives the valve plate 33 to rotate under the pressure of the adjusting ring, so that the valve plate 33 gradually closes/opens the discharging port. The driving member 333 is clamped between the adjusting sleeve 34 and the adjusting ring, which can reduce the influence of the external structure on the driving member 333, thereby improving the stability of the control process of the valve plate 33.

Figure 4:
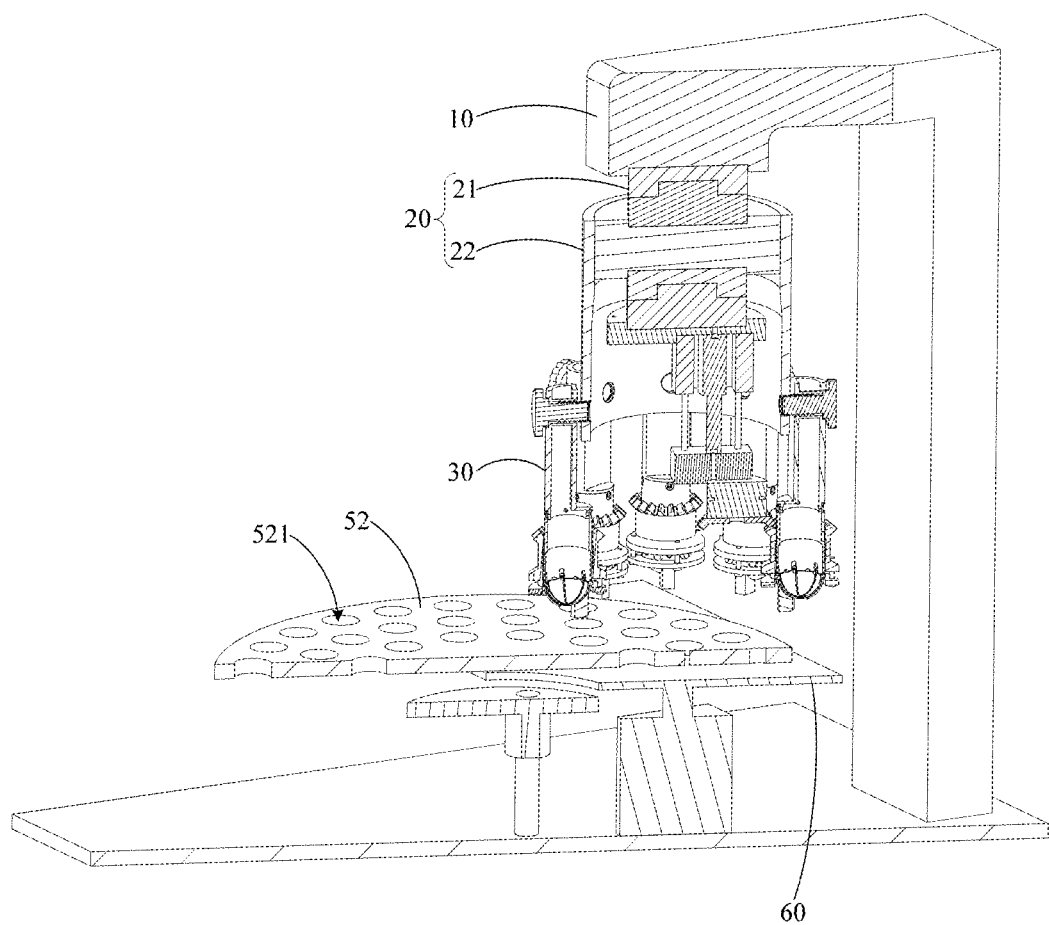
FIG. 4 is a schematic cross-sectional view of a third embodiment of the particulate matter batching apparatus of the present disclosure.
Figure 5:
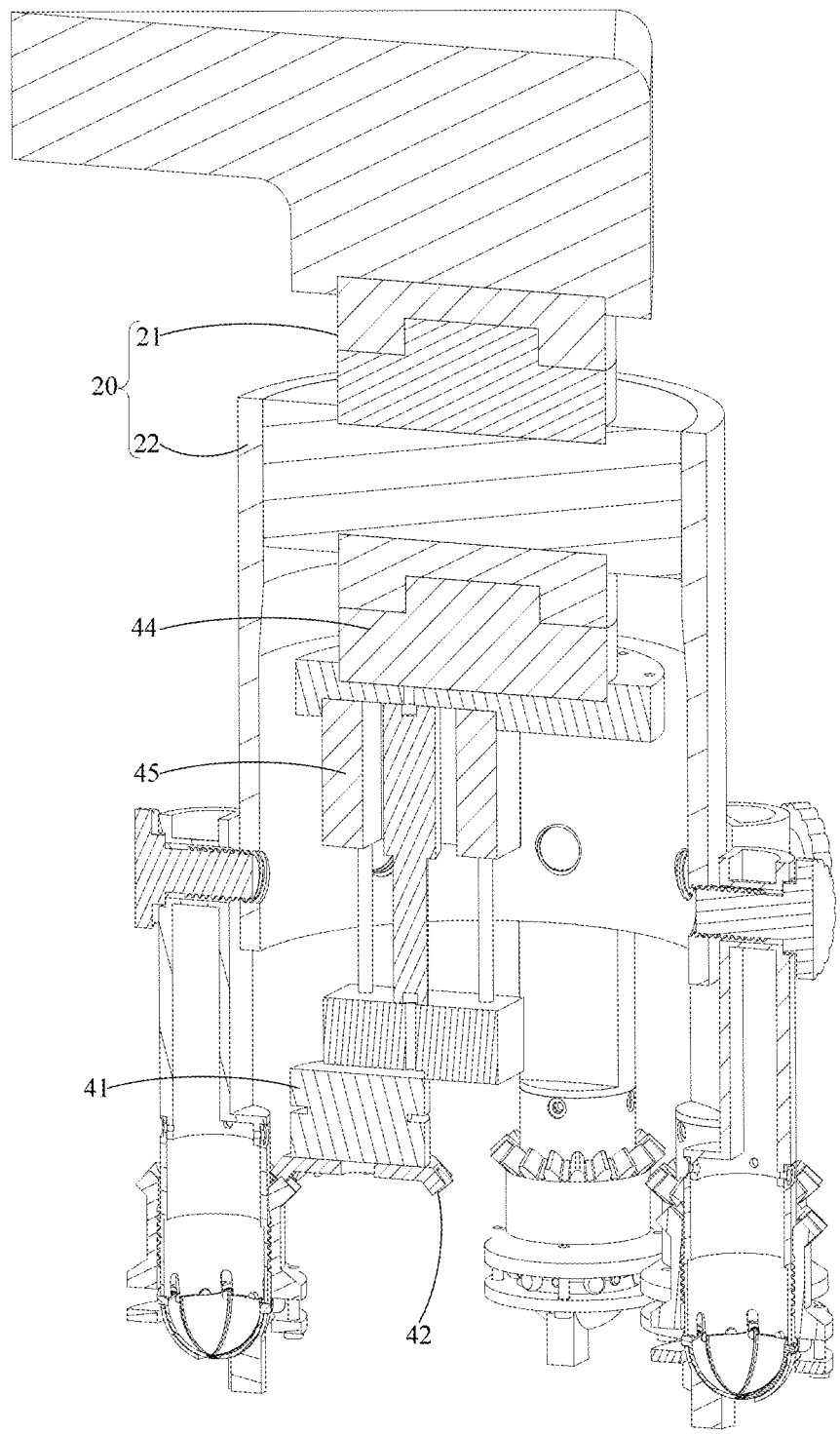
FIG. 5 is a schematic view of the particulate matter batching device and a first driving mechanism of an embodiment of the particulate matter batching apparatus of the present disclosure.
Figure 6:
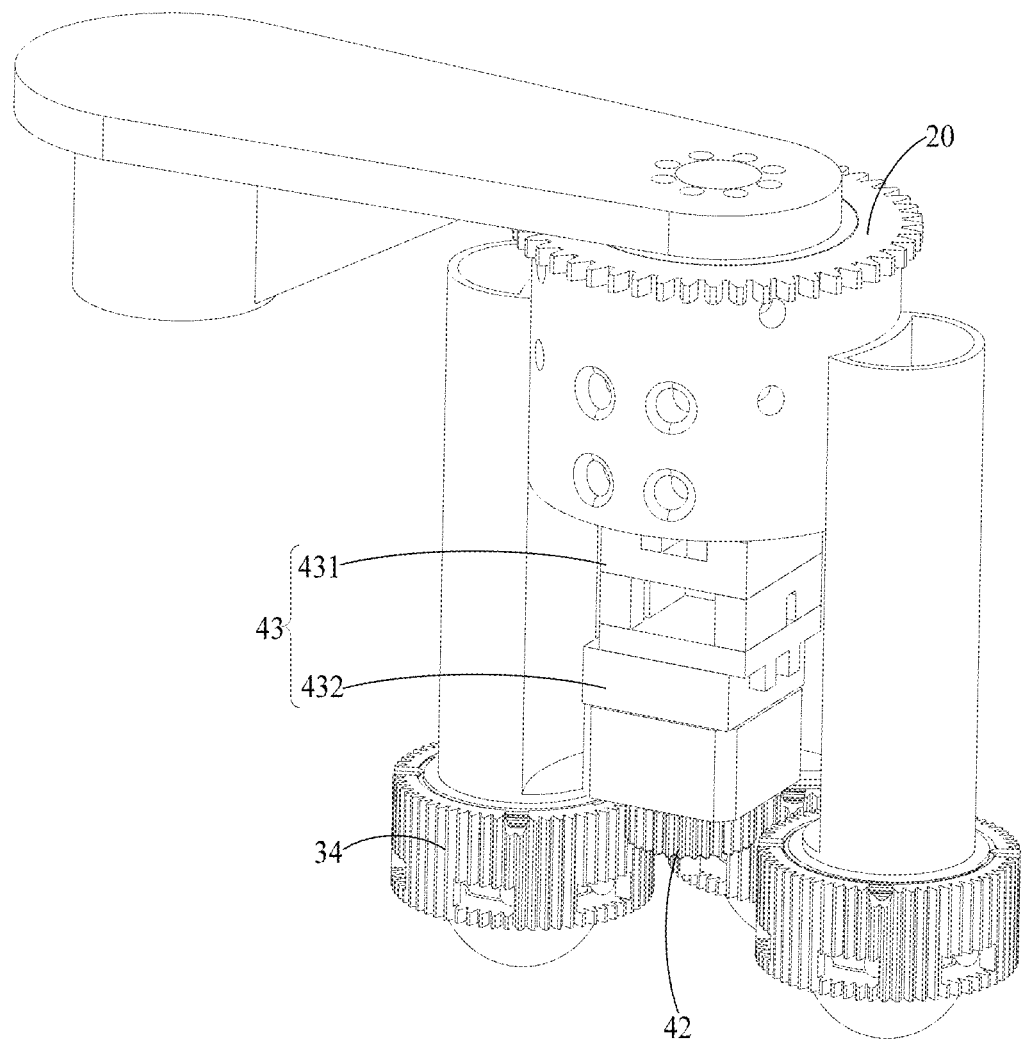
FIG. 6 is a schematic view of the particulate matter batching device and a first driving mechanism of another embodiment of the particulate matter batching apparatus of the present disclosure.
Figure 7:
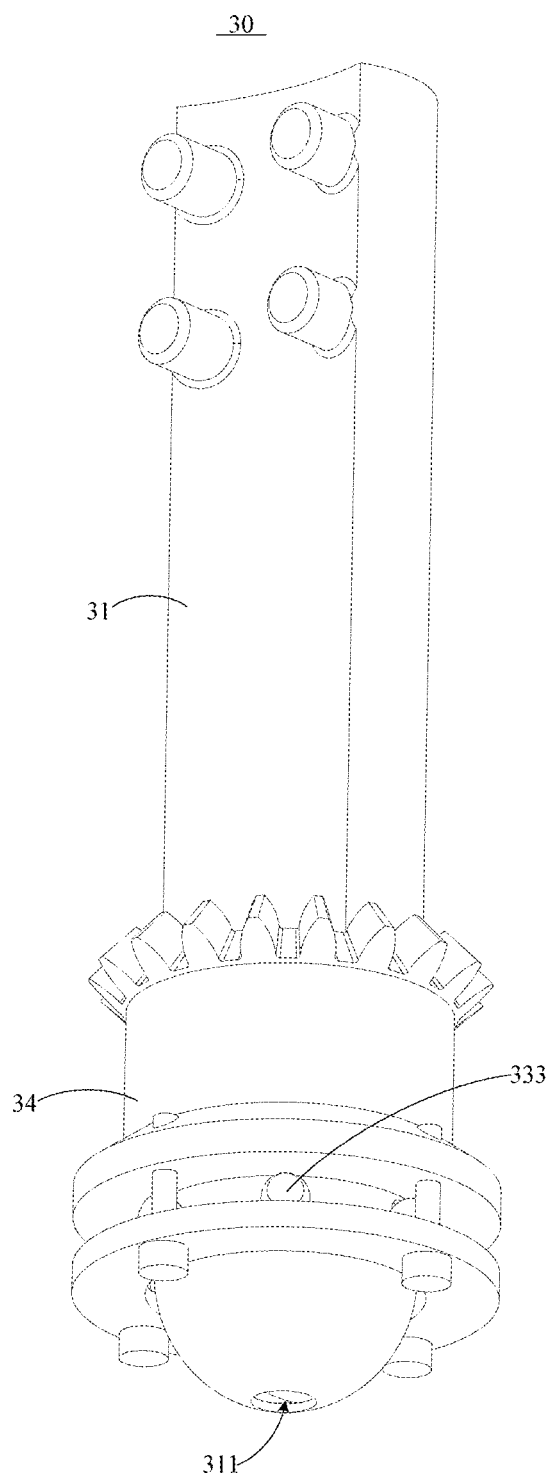
FIG. 7 is a schematic view of an embodiment of the particulate matter batching device of the present disclosure.
Figure 8:
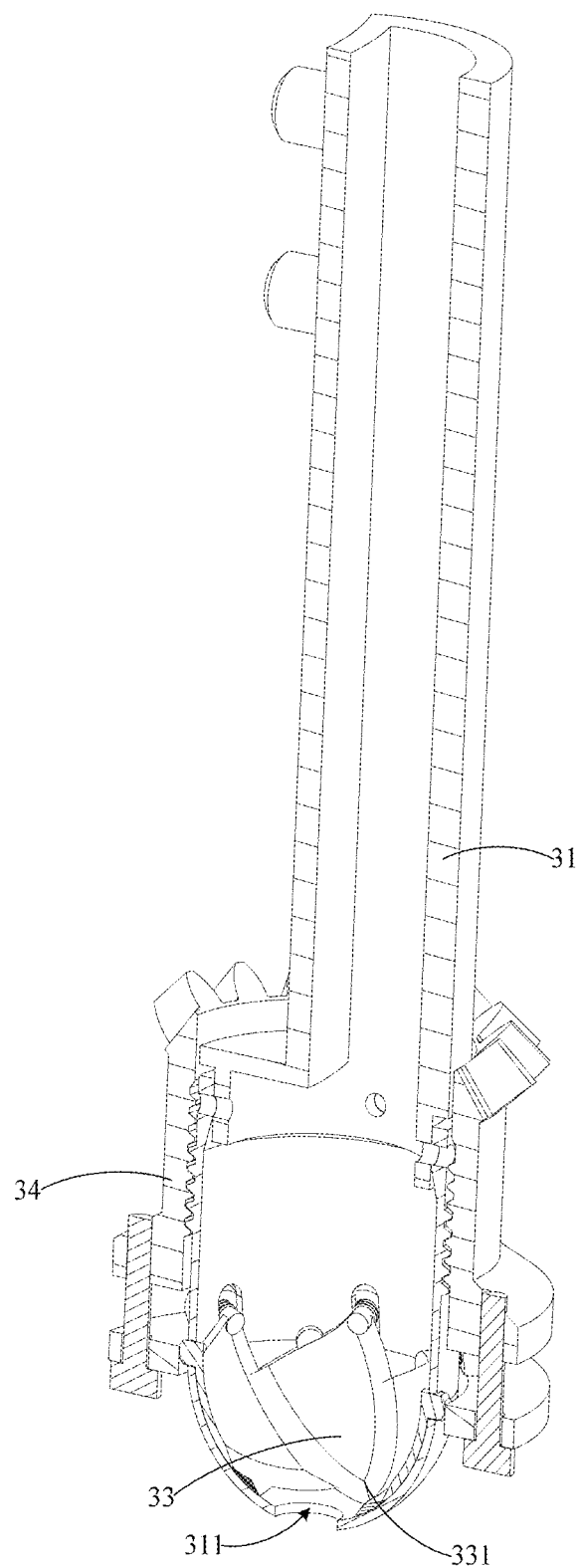
FIG. 8 is a schematic cross-sectional view of an embodiment of the particulate matter batching device of the present disclosure.
Figure 9:
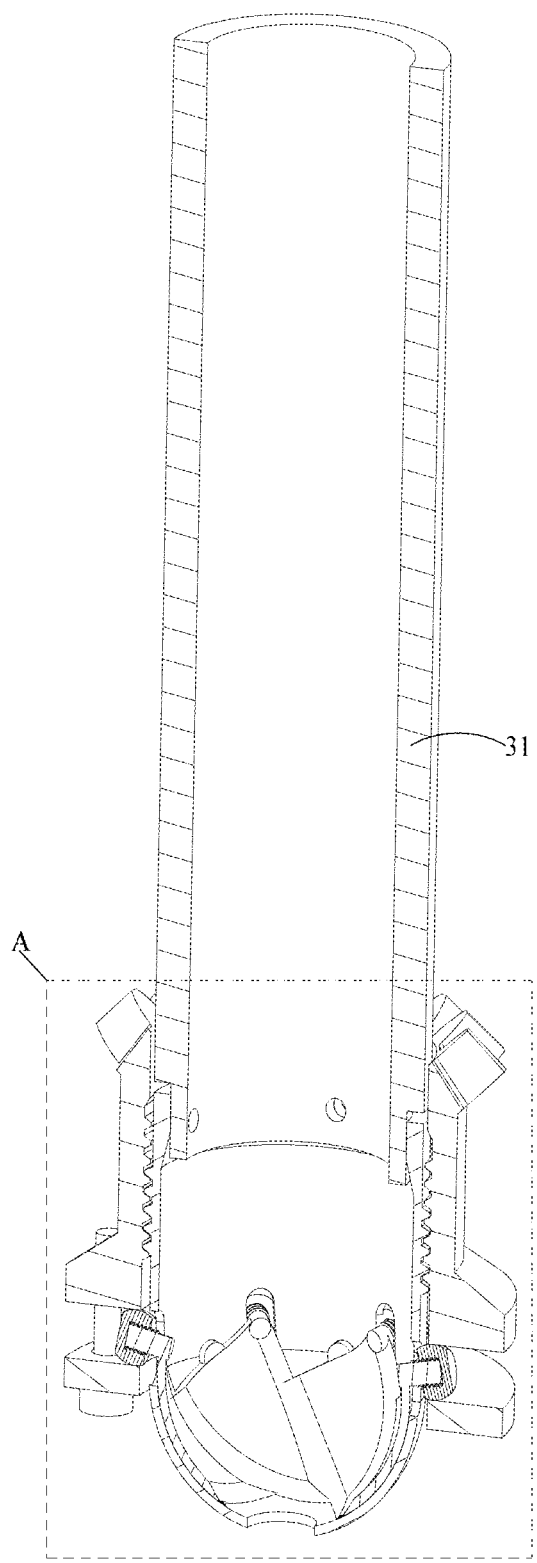
FIG. 9 is a schematic cross-sectional view of another embodiment of the particulate matter batching device of the present disclosure.
Figure 10:
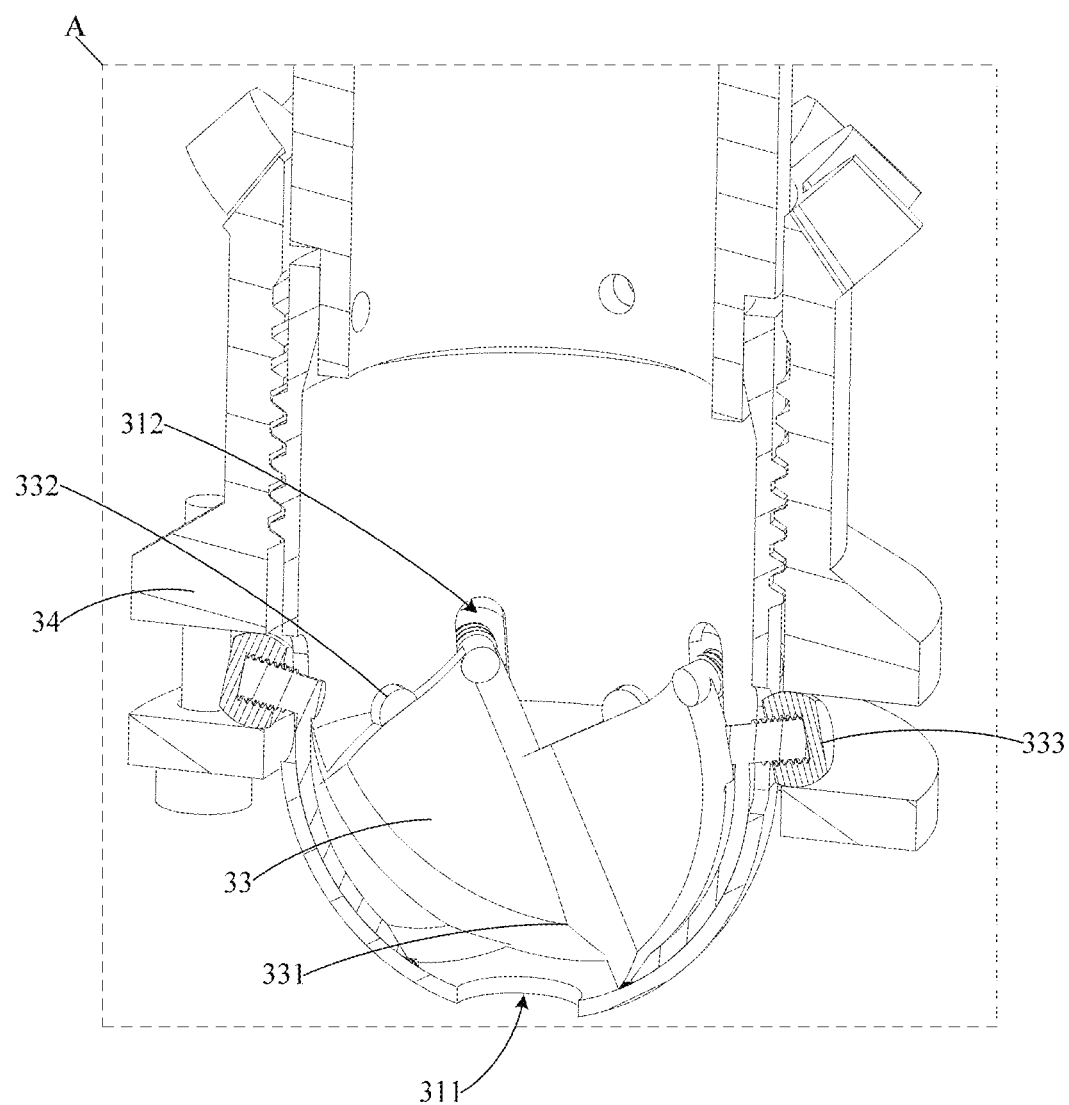
FIG. 10 is a partial enlarged view of part A of FIG. 9.

As shown in FIG. 4 to FIG. 6, the particulate matter batching apparatus further includes a second driving mechanism. The second driving mechanism includes a first driving device 41 and a driving member 42 connected to the first driving device 41. The driving member 42 is configured to be coupled to the discharging adjusting mechanism 32 of the particulate matter batching device 30 located in the discharging position, so as to drive the discharging adjusting mechanism 32.

It can be understood that the driving member 42 is only coupled to the discharging adjusting mechanism 32 of one particulate matter batching device 30 each time. That is, only one particulate matter batching device 30 is controlled to discharge particulate matter each time. The particulate matter batching device 30 needs to rotate to the discharging position to release particulate matter under the driving action of the driving member 42.

With reference to embodiments of the valve plate 32 and the adjusting sleeve 34, the outer peripheral wall of the adjusting sleeve 34 defines driving teeth. The driving member 42 is a driving gear; and the driving gear and the adjusting sleeve 34 engage with each other, thereby driving the discharging adjusting mechanism 32 by the first driving device 41.

The plurality of particulate matter batching devices 30 may also have a plurality of discharging positions on the rotating track, and at this time, the driving member 42 needs to move to be coupled to the discharging adjusting mechanism 32 on different discharging positions.

As shown in FIG. 6, the first driving mechanism 20 includes a central portion 21 and a rotating cylinder 22. The rotating cylinder 22 is annularly disposed on the center portion 21, and each of the particulate matter batching devices 30 is connected to the rotating cylinder 22. The second driving mechanism further includes a planar motion mechanism 43. The planar motion mechanism 43 is mounted to the central portion 21. The first driving device 41 is mounted to the planar motion mechanism 43. The planar motion mechanism 43 is configured to drive the driving member 42 to be coupled to different discharging adjusting mechanisms 32 of different particle batching devices 30.

In an embodiment, the rotating cylinder 22 of the first driving mechanism 20 is configured to drive the plurality of particulate matter batching devices 30 to rotate, and the central portion 21 is fixedly mounted to the bracket 10. Therefore, the planar movement mechanism 43 mounted on the central portion 21 does not rotate with the rotating cylinder 22.

In another embodiment, the center portion 21 is rotatably mounted to the bracket 10, and rotates synchronously with the rotating cylinder 22. Since the rotating cylinder 22 is located at the periphery of the central portion 21, the second driving mechanism mounted to the central portion 21 is always surrounded by the plurality of particulate matter batching devices 30.

The motion direction of the planar motion mechanism 43 is perpendicular to the rotation axis of the first driving mechanism 20. Specifically, the planar motion mechanism 43 includes a first linear sub-mechanism 431 and a second linear sub-mechanism 432. The first linear sub-mechanism 431 moves in a first linear motion direction. The second linear sub-mechanism 432 moves in the second linear motion direction. The first linear motion direction is perpendicular to the second linear motion direction. The planar motion mechanism 43 can drive the first driving device 41 to do horizontal plane motion, so that the driving member 42 of the first driving device 41 can be sequentially coupled with the discharging adjusting mechanism 32 of the different particle batching devices 30, so as to sequentially control the different particle batching devices 30 to discharge particulate matter.

A plurality of material receiving portions may be disposed on the receiving device in the embodiments with a plurality of discharging positions. The planar motion mechanism 43 first drives the first driving device 41 to move after each particulate matter batching device 30 rotates to corresponding material receiving portion below, thereby enabling the driving member 42 to be coupled to the corresponding discharging adjusting mechanism 32. The first driving device 41 drives the driving member 42 to rotate to control the discharging adjusting mechanism 32 to open the discharging port 311 of the particulate matter batching device 30. After the discharging of the current particulate matter batching device 30 is finished, the planar motion mechanism 43 drives the driving member 42 to be coupled to the discharging adjusting mechanism 32 of another particle batching device 30, thereby sequentially opening different discharging ports 311 of the different particle batching devices 30 to realize the sequential discharging of different particle material batching devices 30. In this way, the particulate matter batching device can adapt to more complex application environments, so as to improve the batching efficiency in different application environments.

In another embodiment, as shown in FIG. 4 and FIG. 5, the first driving mechanism 20 includes a central portion 21 and a rotating cylinder 22. The rotating cylinder 22 is annularly disposed on the center portion 21, and each of the particulate matter batching devices 30 is connected to the rotating cylinder 22. The second driving mechanism further includes an eccentric rotation mechanism 44. The eccentric rotation mechanism 44 is mounted to the central portion 21. The first driving device 41 is mounted to the eccentric rotation mechanism 44, thereby enabling the center line of the driving member 42 to be parallel to the rotation axis. The eccentric rotating mechanism 44 is configured to drive the first driving device 41 to rotate around the rotation axis, so as to be coupled to the discharging adjusting mechanism 32 of the different particulate matter batching devices 30.

Unlike the planar motion mechanism 43, the eccentric rotating mechanism 44 couples the driving member 42 with different discharging adjusting mechanisms 32 of different particulate matter batching device 30 by driving the first driving device 41 to eccentrically rotate around the rotation axis. After the driving member 42 is coupled to the discharging adjusting mechanism 32, the first driving device 41 drives the adjusting gear to rotate to control the discharging adjusting mechanism to open the discharging port 311 of the current particle batching device 30. After the discharging of the current particulate matter batching device 30 is finished, the eccentric rotating mechanism 44 drives the driving member 42 to be coupled to another discharging adjusting mechanism 32 of another particulate matter batching device 30, so as to sequentially open different discharging ports 311 of the different particle batching devices 30, thereby realizing the sequential discharging of different particle material batching devices 30. In this way, the particulate matter batching apparatus can adapt to more complex application environments, so as to improve the batching efficiency in different application environments.

Specifically, as shown in FIG. 5, the second driving mechanism further includes a first lifting mechanism 45. The first lifting mechanism 45 is mounted to the central portion 21. The eccentric rotating mechanism 44 is mounted to the first lifting mechanism 45 to lift under the driving of the first lifting mechanism 45.

The first lifting mechanism 45 can drive the eccentric rotating mechanism 44 and the first driving device 41 to ascend and descend. Before the eccentric rotating mechanism 44 drives the first driving device 41 to rotate, the first lifting mechanism 45 may first drive the eccentric rotating mechanism 44 and the first driving device 41 to lift to enable the driving member 42 to avoid each adjusting sleeve 34, thereby preventing the driving member 42 from being mutually blocked with the adjusting sleeve 34 during the process of transmission location of the driving member 42. So that the stability of the driving member 42 in the position changing process can be improved.

Figure 2:
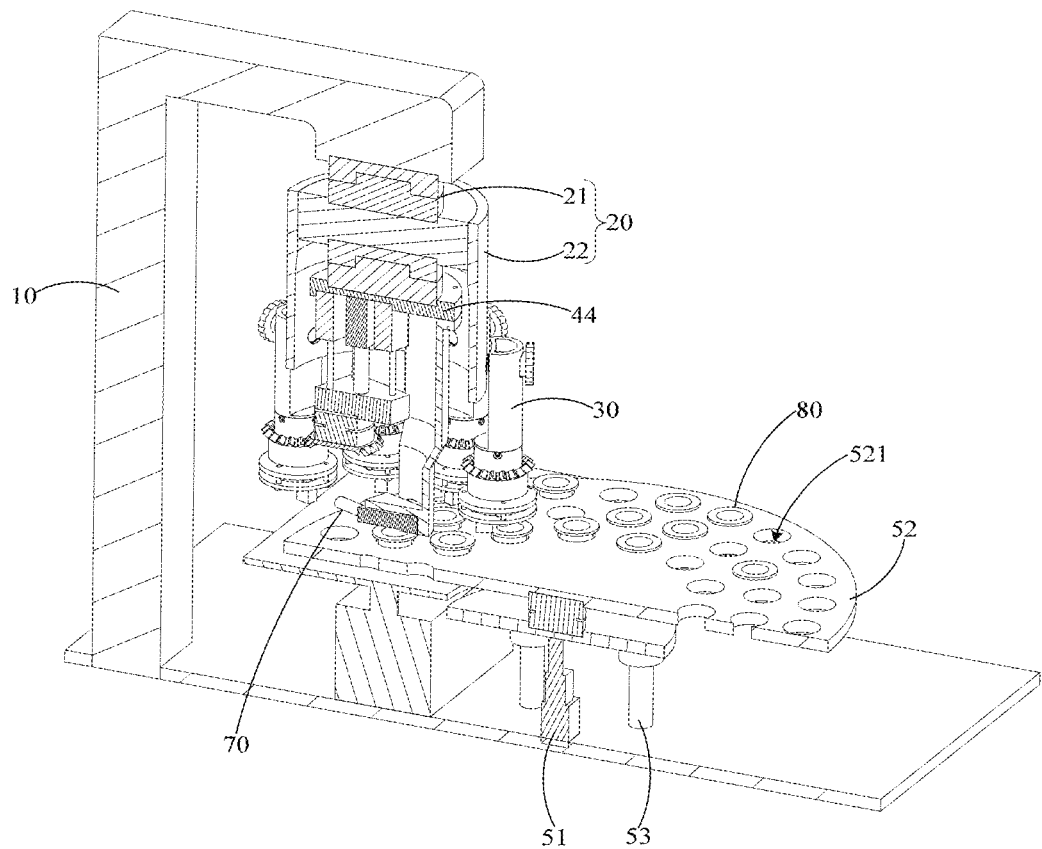
FIG. 2 is a schematic cross-sectional view of an embodiment of the particulate matter batching apparatus of the present disclosure.
Figure 3:
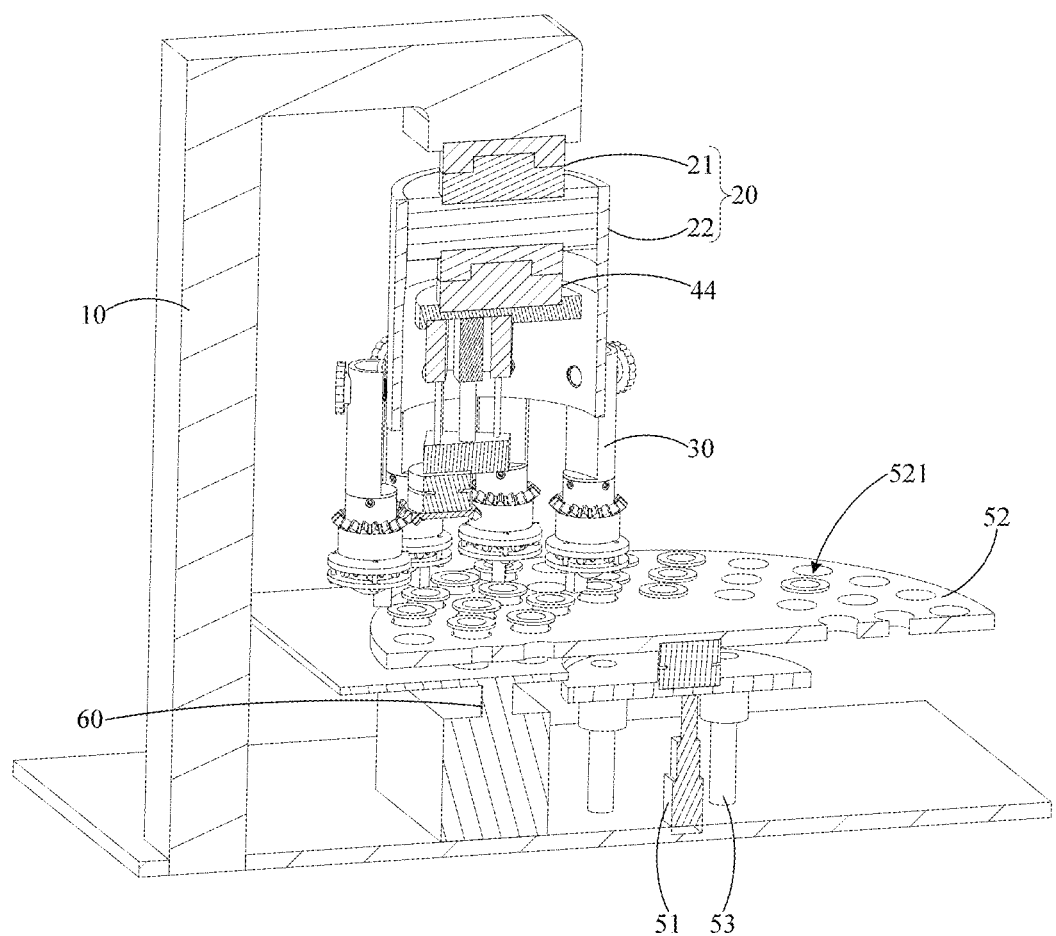
FIG. 3 is a schematic cross-sectional view of a second embodiment of the particulate matter batching apparatus of the present disclosure.

As shown in FIG. 1 to FIG. 3, the receiving device includes a third driving mechanism and a rotating platform 52. The rotating platform 52 has a placing portion 521. The placing portion 521 is configured to receive the receiving container 80. The third driving mechanism includes a second rotating mechanism 51. The rotating platform 52 is mounted to the second rotating mechanism 51 to rotate under the driving of the second rotating mechanism 51. The placing portion 521 has a receiving position on the rotation track, and the receiving position is located below the discharging position. The second rotating mechanism 51 may be located above the rotating platform 52 or below the rotating platform 52, which is not limited herein. The second rotating mechanism 51 can drive the rotating platform 52 to rotate, so that the taking and placing part 521 can enter or leave the receiving position. During the batching process of the particulate matter batching device, the user may place the receiving container 80 in the placing portion 521, so that the receiving container 80 enters the receiving position along with the placing portion 521 to receive the particulate matter from the discharging position. After the receiving container 80 receives the particulate matter, the second rotating mechanism 51 can drive the rotating platform 52 to rotate, so that the receiving container 80 leaves the receiving position along with the placing portion 521, thereby facilitating the user to take away the receiving container 80 filled with the mixture of particulate matter. In this way, automation of the receiving process of the receiving device can be realized, and the convenience of the receiving process and the receiving efficiency are improved.

Specifically, as shown in FIG. 1 to FIG. 3, there are at least two placing portions 521. The at least two placing portions 521 are arranged at intervals along the circumferential direction of the rotating platform 52. At least two of the placing portions 521 rotate with the rotating platform 52 to switchably enter or exit the receiving position. After the previous placing portion 521 leaves the receiving position and reaches the preset position, the next placing portion 521 just enters the receiving position to receive particulate matter. In this way, the interval time of the particulate matter batching apparatus between two discharging operation can be shortened, thereby improving the batching efficiency of the particulate matter batching apparatus.

As shown in FIG. 1 to FIG. 3, the receiving device further includes a weighing device 60. The weighing device 60 is located below the receiving position. The weighing device 60 is configured to weigh the weight of the receiving container 80. It can be understood that the weighing device 60 weighs the weight of the particulate matter received by the receiving container 80 each time, and after the weight of the same particulate matter reaches the preset weight, the first driving device 41 controls the discharging adjusting mechanism 32 to close the discharging port 311 of the batching container 31 to stop discharging.

After the placing portion 521 drives the receiving container 80 to reach the receiving position, the receiving container 80 may first leave the placing portion 521 and then be placed on the weighing device 60, or is directly placed on the weighing device 60 without leaving the placing portion 521.

Specifically, as shown in FIG. 1 to FIG. 3, the third driving mechanism further includes a second lifting mechanism 53. The second lifting mechanism 53 is connected to the rotating platform 52 to drive the rotating platform 52 to ascend and descend. The placing portion 521 defines a receiving hole. The receiving hole is configured to receive the receiving container 80 to enable the receiving container 80 to hang in the receiving hole. The second lifting mechanism 53 is configured to drive the rotating platform 52 to descend when the placing portion 521 rotates to the receiving position, so as to place the receiving container 80 on the weighing device 60.

The receiving container 80 has a hanging lug, or the shape of the receiving container 80 may be set to be large and small, so that the receiving container 80 can be directly hung in the pick-and-place hole. After the placing portion 521 drives the receiving container 80 to reach the receiving position, the receiving container 80 is located directly above the weighing device 60. The second lifting mechanism 53 drives the rotating platform 52 to descend, and the receiving container 80 descends with the rotating platform 52 until the receiving container 80 is placed on the weighing device 60. Then, the rotating platform 52 continues to descend until the rotating platform 52 does not make contact with the receiving container 80, so as to prevent the rotating platform 52 from affecting the weighing process of the receiving container 80, thereby improving the accuracy of the weighing result. After the weighing is finished, the rotating platform 52 rises to support the receiving container 80 far away from the weighing device 60, and then leaves the receiving position in a rotating manner. In this way, the receiving container 80 may enter the receiving position in a rotating manner, and is placed on the weighing device 60 for weighing in a lifting manner, so that automation of the weighing process is achieved, and the batching efficiency of the particulate matter batching apparatus is further improved.

As shown in FIG. 2, the particulate matter batching device further includes a vibrator 70 and a linear driving device 71. The linear driving device 71 is mounted to the central portion 21. The vibrator 70 is mounted to the linear driving device 71. The linear driving device 71 is configured to drive the vibrator 70 to abut against or be away from the particulate matter batching device 30 at the discharging position. The vibrator 70 may be a vibration motor, or may be an ultrasonic homogenizer, which is not limited herein. Only the particulate matter in the batching container 31 needs to be vibrated so as to smoothly pass through the discharging port 311. The linear driving device 71 is capable of driving the vibrator 70 to abut against the particulate matter batching device 30 at the discharging position. In this way, the particulate matter pass through the discharging port 311 more easily, thereby improving the batching efficiency of the particulate matter batching device 30. After the discharging of the current particulate matter batching device 30 is finished, the linear driving device 71 drives the vibrator 70 to be away from the current particulate matter batching device 30, so as to prevent the vibrator 70 from affecting the position switching process of the particulate matter batching device 30.

The particulate matter batching device further includes a control module, a display module, and an interaction module. The interaction module is electrically connected to the control module and the display module. The control module is electrically connected to the first driving mechanism 20. The display module is configured to display a current operation condition of the particulate matter batching apparatus, the interaction module is configured to receive a control instruction inputted by users, and the control module is configured to control the first driving mechanism 20, the second driving mechanism, and the third driving mechanism to operate automatically according to the control instruction.

In the technical solution of the particulate matter batching apparatus of the present disclosure, the plurality of particulate matter batching devices 30 are mounted to the first driving mechanism 20 and are arranged at intervals around the rotation axis, to enable the first driving mechanism 20 to drive the plurality of particulate matter batching devices 30 to rotate around the rotation axis. Thus, each of the particulate matter batching devices 30 can move into the discharging position in a switchable manner. After the particulate matter batching device 30 enters the discharging position, the particulate matter in the batching container 31 can be controlled to start or stop passing through the discharging port 311 through the discharging adjusting mechanism. So that particulate matter in the batching container 31 can fall to the receiving device, and the different particulate matter batching devices 30 are sequentially driven to the discharging position for discharging, thereby mixing the particulate matter. Since the first driving mechanism 20 drives each of the particulate matter batching devices 30 to switch positions in a rotating manner, the activity range of the plurality of particulate matter batching devices 30 can be reduced, thereby reducing the occupied space in the operation process of the particulate matter batching device. In addition, when each particulate matter dispensing device 30 leaves the discharging position, the next particulate matter dispensing device 30 enters the discharging position more quickly. Therefore, the time for switching the different particulate matter batching device 30 to the discharging position can be shortened to improve the batching efficiency.

The above are only preferred embodiments of the present invention, and are not intended to limit the present disclosure, any modification, equivalent replacement, improvement, etc. made within the spirit and principle of the present disclosure shall fall within the protection scope of the present disclosure.

Besides, it can be understood that, although the present disclosure is describe according to the embodiments, each embodiment does not include only on dependent technology solution. The description of the present disclosure is only for clarity. The person skilled in the art should regard the present disclosure as an entirety. Technology solutions in the embodiments can be adequately combined to form other embodiments that can be understood by the person skilled in the art.

What is claimed is:

1. A particulate matter batching apparatus comprising:
   a bracket;
   a first driving mechanism, the first driving mechanism being mounted on the bracket, and the first driving mechanism having a rotation axis extending in a height direction;
   a plurality of particulate matter batching devices, each particulate matter batching device comprising a batching container and a discharging adjusting mechanism, a discharging port being formed in a bottom portion of the batching container, and the discharging adjusting mechanism being configured to control particulate matter in the batching container to start or stop passing through the discharging port; the plurality of particulate matter batching devices being installed on the first driving mechanism so as to be driven to rotate around a rotating axis by the first driving mechanism, and a discharging position being defined on a rotating track of the plurality of the particulate matter batching devices; the plurality of particulate matter batching being arranged at intervals around the rotating axis so as to be driven to switch into or exit from the discharging position by the first driving mechanism; and
   a receiving device mounted below the discharging position and configured to receive particulate matter from the plurality of particulate matter batching devices;
   the particulate matter batching apparatus further comprises a second driving mechanism, the second driving mechanism comprises a first driving device and a driving member connected to the first driving device, and the driving member is configured to couple with and drive the discharging adjusting mechanism of one of the plurality of particulate matter batching devices when the one of the plurality of particulate matter batching devices moves to the discharging position;
   the first driving mechanism comprises a center portion and a rotating cylinder, the rotating cylinder is annularly disposed at the center portion, and each of the plurality of particulate matter batching devices is connected to the rotating cylinder; the second driving mechanism further comprises an eccentric rotating mechanism, the eccentric rotating mechanism is installed on the center portion, the first driving device is installed on the eccentric rotating mechanism, so that a center line of the driving piece is parallel to the rotating axis, and the eccentric rotating mechanism is configured to drive the first driving device to rotate around the rotating axis so as to be coupled with different discharging adjusting mechanisms of different particle batching devices.

2. The particulate matter batching apparatus according to claim 1, wherein the second driving mechanism further comprises a first lifting mechanism, the first lifting mechanism is mounted on the center portion, and the eccentric rotating mechanism is mounted on the first lifting mechanism to be driven to lift by the first lifting mechanism.

3. The particulate matter batching apparatus according to claim 2, wherein the first driving mechanism comprises a center portion and a rotating cylinder, the rotating cylinder is annularly disposed at the center portion, and each of the particulate matter batching devices is connected to the rotating cylinder; the second driving mechanism further comprises a planar motion mechanism, the planar motion mechanism is mounted on the central portion, the first driving device is mounted on the planar motion mechanism, and the planar motion mechanism is configured to drive the driving member to be coupled with different discharging adjusting mechanisms of different particulate matter batching devices.

4. The particulate matter batching apparatus according to claim 2, wherein the discharging adjusting mechanism comprises a plurality of valve plates and an adjusting sleeve, the plurality of valve plates are rotatably mounted in the batching container to adjust an opening degree of the discharging port, and the adjusting sleeve is rotatably sleeved on the batching container and is in transmission connection with the valve plate to drive the valve plate to rotate; transmission teeth are arranged on a peripheral wall of the adjusting sleeve, and the driving piece is a driving gear; the plurality of valve plates are distributed in a circumferential direction of the discharging port, each valve plate comprises an adjusting end, and the adjusting end rotates along with the valve plate to get close to or away from a center of the discharging port; the adjusting ends of the plurality of valve plates are configured to gather towards the center of the discharging port to jointly close the discharging port, and to disperse in a direction far away from the center of the discharging port to jointly open the discharging port; a shaft hole and an adjusting hole are defined in a peripheral wall of the batching container, a rotating shaft and a transmission piece are connected to an end of the valve plate far away from the adjusting end, the rotating shaft is rotatably mounted in the shaft hole, and the transmission piece extends out of the batching container through the adjusting hole; the adjusting sleeve threadedly engages with the ingredient container and is connected to the driving member to drive the driving member to move.

5. The particulate matter batching apparatus according to claim 2, wherein the receiving device comprises a third driving mechanism and a rotating platform, the rotating platform is provided with a placing portion, and the placing portion is configured to receive the receiving container; the third driving mechanism comprises a second rotating mechanism, and the rotating platform is mounted to the second rotating mechanism to be driven to rotate by the second rotating mechanism; the placing portion has a receiving position on the rotating track, and the receiving position is located below the discharging position.

6. The particulate matter batching apparatus according to claim 2, wherein the particulate matter batching apparatus further comprises a vibrator and a linear driving device, wherein the linear driving device is mounted to the central portion, the vibrator is mounted to the linear driving device, and the linear driving device is configured to drive the vibrator to abut against or move far away from the particulate matter batching apparatus located at the discharging position.

7. The particulate matter batching apparatus according to claim 1, wherein the first driving mechanism comprises a center portion and a rotating cylinder, the rotating cylinder is annularly disposed at the center portion, and each of the particulate matter batching devices is connected to the rotating cylinder; the second driving mechanism further comprises a planar motion mechanism, the planar motion mechanism is mounted on the central portion, the first driving device is mounted on the planar motion mechanism, and the planar motion mechanism is configured to drive the driving member to be coupled with different discharging adjusting mechanisms of different particulate matter batching devices.

8. The particulate matter batching apparatus according to claim 7, wherein the receiving device comprises a third driving mechanism and a rotating platform, the rotating platform is provided with a placing portion, and the placing portion is configured to receive the receiving container; the third driving mechanism comprises a second rotating mechanism, and the rotating platform is mounted to the second rotating mechanism to be driven to rotate by the second rotating mechanism; the placing portion has a receiving position on the rotating track, and the receiving position is located below the discharging position.

9. The particulate matter batching apparatus according to claim 1, wherein the discharging adjusting mechanism comprises a plurality of valve plates and an adjusting sleeve, the plurality of valve plates are rotatably mounted in the batching container to adjust an opening degree of the discharging port, and the adjusting sleeve is rotatably sleeved on the batching container and is in transmission connection with the valve plate to drive the valve plate to rotate; transmission teeth are arranged on a peripheral wall of the adjusting sleeve, and the driving piece is a driving gear; the plurality of valve plates are distributed in a circumferential direction of the discharging port, each valve plate comprises an adjusting end, and the adjusting end rotates along with the valve plate to get close to or away from a center of the discharging port; the adjusting ends of the plurality of valve plates are configured to gather towards the center of the discharging port to jointly close the discharging port, and to disperse in a direction far away from the center of the discharging port to jointly open the discharging port; a shaft hole and an adjusting hole are defined in a peripheral wall of the batching container, a rotating shaft and a transmission piece are connected to an end of the valve plate far away from the adjusting end, the rotating shaft is rotatably mounted in the shaft hole, and the transmission piece extends out of the batching container through the adjusting hole; the adjusting sleeve threadedly engages with the ingredient container and is connected to the driving member to drive the driving member to move.

10. The particulate matter batching apparatus according to claim 1, wherein the receiving device comprises a third driving mechanism and a rotating platform, the rotating platform is provided with a placing portion, and the placing portion is configured to receive the receiving container; the third driving mechanism comprises a second rotating mechanism, and the rotating platform is mounted to the second rotating mechanism to be driven to rotate by the second rotating mechanism; the placing portion has a receiving position on the rotating track, and the receiving position is located below the discharging position.

11. The particulate matter batching apparatus according to claim 10, wherein the receiving device further comprises a weighing device, the weighing device is located below the receiving position, and the weighing device is configured to weigh the weight of the receiving container.

12. The particulate matter batching apparatus according to claim 11, wherein the third driving mechanism further comprises a second lifting mechanism, and the second lifting mechanism is connected to the rotating platform to drive the rotating platform to ascend and descend; the placing portion defines a receiving hole, and the receiving hole is configured to receive the receiving container to enable the receiving container to hang in the receiving hole; and the second lifting mechanism is configured to drive the rotating platform to descend when the placing portion rotates to the material receiving position so as to place the receiving container on the weighing device.

13. The particulate matter batching apparatus according to claim 1, wherein the particulate matter batching apparatus further comprises a vibrator and a linear driving device, wherein the linear driving device is mounted to the central portion, the vibrator is mounted to the linear driving device, and the linear driving device is configured to drive the vibrator to abut against or move far away from the particulate matter batching apparatus located at the discharging position.

14. The particulate matter batching apparatus according to claim 1, wherein the particulate matter batching apparatus further comprises a control module, a display module and an interaction module, wherein the interaction module is electrically connected to the control module and the display module, and the control module is electrically connected to the first driving mechanism.

15. The particulate matter batching apparatus according to claim 1, wherein the first driving mechanism comprises a center portion and a rotating cylinder, the rotating cylinder is annularly disposed at the center portion, and each of the particulate matter batching devices is connected to the rotating cylinder; the second driving mechanism further comprises a planar motion mechanism, the planar motion mechanism is mounted on the central portion, the first driving device is mounted on the planar motion mechanism, and the planar motion mechanism is configured to drive the driving member to be coupled with different discharging adjusting mechanisms of different particulate matter batching devices.

16. The particulate matter batching apparatus according to claim 1, wherein the discharging adjusting mechanism comprises a plurality of valve plates and an adjusting sleeve, the plurality of valve plates are rotatably mounted in the batching container to adjust an opening degree of the discharging port, and the adjusting sleeve is rotatably sleeved on the batching container and is in transmission connection with the valve plate to drive the valve plate to rotate; transmission teeth are arranged on a peripheral wall of the adjusting sleeve, and the driving piece is a driving gear; the plurality of valve plates are distributed in a circumferential direction of the discharging port, each valve plate comprises an adjusting end, and the adjusting end rotates along with the valve plate to get close to or away from a center of the discharging port; the adjusting ends of the plurality of valve plates are configured to gather towards the center of the discharging port to jointly close the discharging port, and to disperse in a direction far away from the center of the discharging port to jointly open the discharging port; a shaft hole and an adjusting hole are defined in a peripheral wall of the batching container, a rotating shaft and a transmission piece are connected to an end of the valve plate far away from the adjusting end, the rotating shaft is rotatably mounted in the shaft hole, and the transmission piece extends out of the batching container through the adjusting hole; the adjusting sleeve threadedly engages with the ingredient container and is connected to the driving member to drive the driving member to move.

17. The particulate matter batching apparatus according to claim 1, wherein the receiving device comprises a third driving mechanism and a rotating platform, the rotating platform is provided with a placing portion, and the placing portion is configured to receive the receiving container; the third driving mechanism comprises a second rotating mechanism, and the rotating platform is mounted to the second rotating mechanism to be driven to rotate by the second rotating mechanism; the placing portion has a receiving position on the rotating track, and the receiving position is located below the discharging position.

18. The particulate matter batching apparatus according to claim 1, wherein the receiving device comprises a third driving mechanism and a rotating platform, the rotating platform is provided with a placing portion, and the placing portion is configured to receive the receiving container; the third driving mechanism comprises a second rotating mechanism, and the rotating platform is mounted to the second rotating mechanism to be driven to rotate by the second rotating mechanism; the placing portion has a receiving position on the rotating track, and the receiving position is located below the discharging position.

* * * * *